United States Patent [19]

Bruno et al.

[11] Patent Number: 5,397,583
[45] Date of Patent: Mar. 14, 1995

[54] HIGH-MOISTURE RAISINS FOR USE IN FOOD PROCESSING

[75] Inventors: Richard C. Bruno, Lodi; Huey Corinne, Woodland, both of Calif.

[73] Assignee: Sun-Maid Growers of California, Inc., Kingsburg, Calif.

[21] Appl. No.: 168,704

[22] Filed: Dec. 16, 1993

Related U.S. Application Data

[63] Continuation-in-part of Ser. No. 991,809, Dec. 16, 1992, abandoned.

[51] Int. Cl.$^6$ .................. A23L 3/3418; A23L 3/34
[52] U.S. Cl. ................ 426/324; 426/331; 426/640
[58] Field of Search ............. 426/106, 324, 326, 331, 426/333, 402, 404, 455, 640

[56] References Cited

U.S. PATENT DOCUMENTS

| | | |
|---|---|---|
| 732,563 | 6/1903 | Keyes . |
| 1,414,275 | 4/1922 | Harrison . |
| 1,711,729 | 5/1929 | Forrest . |
| 1,871,507 | 8/1932 | Gardner . |
| 2,092,777 | 9/1937 | Rey ............................... 99/104 |
| 2,123,134 | 7/1938 | Cowgill . |
| 2,139,915 | 12/1938 | Rey . |
| 2,143,903 | 1/1939 | Wilbur ........................... 426/402 |
| 2,498,949 | 2/1950 | Forrest . |
| 3,793,939 | 2/1974 | Wieser . |
| 4,103,035 | 7/1978 | Fulger ............................ 426/640 |
| 4,326,341 | 4/1982 | Anderson . |
| 4,409,252 | 10/1983 | Buschkens . |
| 4,411,918 | 10/1983 | Cimino . |
| 4,515,266 | 5/1985 | Myers . |
| 4,777,782 | 10/1988 | Nixon . |
| 4,792,455 | 12/1988 | Tallafus . |
| 5,073,400 | 12/1991 | Bruno ............................ 426/640 |
| 5,110,609 | 5/1992 | Lewis ............................ 426/402 |
| 5,188,861 | 2/1993 | Mazin ............................ 426/639 |
| 5,286,505 | 2/1994 | Hartson ......................... 426/321 |

OTHER PUBLICATIONS

Rominger, R., Report No. 1, State of California Food and Agriculture Department delegation to the European Economic Community, pp. 1–29 (Dec. 1978).
Bolin, H. R., "Txture and Crystallization Control in Raisins," U.S.D.A. Western Regional Research Laboratory, ARS, Berkeley, Calif., *Journal of Food Science*, vol. 41, pp. 1316–1319 (1976).
Mrak, E., et al., "High Moisture Confection Raisins," Third Progress Report, Department of Food Technology, College of Agriculture, University of California at Davis, pp. 263–268 (1954).
Miller, M. W., et al., "The Constituents of the Crystalline Deposits on Dried Fruit," manuscript, Department of Food Science and Technology, University of California at Davis, pp. 424–428 (May 21, 1959).
Miller, M. W., et al., "Production of High Moisture Raisins," manuscript, Department of Food Science and Technology, University of California at Davis, pp. 276–279 (Apr. 11, 1961).
Zoecklin, B. W., et al., "Factors Affecting the Formation of Degradative Crystals in Thompson Seedless Raisins During Prolonged Storage," report, California State University at Fresno, School of Agriculture and Home Economics, Plant Science Department, Viticulture Research Program of C.S.U.F. and Sun–Maid Growers of California, pp. 1–41 (May 20, 1981).

*Primary Examiner*—Michael W. Ball
*Assistant Examiner*—Daniel J. Stemmer
*Attorney, Agent, or Firm*—Townsend and Townsend Khourie and Crew

[57] ABSTRACT

Raisins are preconditioned for use in food preparations where a high moisture content is required, by exposing the raisins to heated water or steam to elevate the temperature to 130° F. (54° C.) or above, followed by reducing the oxygen content of the atmosphere surrounding the raisins and sealing them in moisture-tight and air-tight packaging while still hot, and storing the raisins in this condition for a sufficient period of time to destroy substantially all spoilage microorganisms present. If held for at least twelve hours and the temperature is at least about 120° F. (49° C.), sugaring is prevented as well. The result is a highly uniform product with pleasing appearance and texture suitable for direct use in baking or other food preparations.

16 Claims, No Drawings

HIGH-MOISTURE RAISINS FOR USE IN FOOD PROCESSING

CROSS REFERENCE TO RELATED APPLICATION

This application is a continuation-in-part of co-pending application Ser. No. 07/991,809, filed Dec. 16, 1992, abandoned.

This invention lies in the field of dried fruits, and the conditioning of dried fruits for use in prepared foods such as baked goods, confections, dairy products and snack foods.

BACKGROUND OF THE INVENTION

Raisins have long been a popular and widely used food, either alone as a snack food, as toppings on cereals or mixed with other foods to form salads, or in cooked or baked food preparations such as puddings, cakes, cookies and bread. While appealing taste and nutritional value are among the most desirable assets of raisins, the industry has found it beneficial to treat raisins in various ways and to impose certain restrictions on them to prolong their texture and retard spoilage. Factors adverse to their appeal which these methods and restrictions are intended to address are the formation of crystals (hydrates of glucose, fructose and sucrose as well as potassium bitartrate, the crystal formation known in the industry as "sugaring"), and the occurrence of fermentive spoilage and mold spoilage. California Thompson Seedless raisins, for example, are subject to a maximum moisture level of 18% by weight for purposes of avoiding sugaring and spoilage. Muscats are subject to a maximum of 19%. Zante currants are subject to a maximum of 20%. Other varieties are subject to similar maxima.

When raisins are used in commercial food preparations, however, such as baked goods, confections, and dairy products, a higher moisture content is preferred. This prevents the drying and hardening of the raisins during either the preparation or the storage of the food product. These problems are particularly prominent in bakery operations. To avoid these problems, the raisins are preconditioned to raise the moisture level, generally to about 25%, corresponding to a water activity of 0.65 or higher. To achieve this without reintroducing the risk of sugaring or spoilage, the conditioning is done on site where the final product is produced. For baked goods, for example, conditioning is performed at the bakery operation prior to combining the raisins with the other baking ingredients. The common method of conditioning is to place raisins having moistures in the range of 14% to 18% in tubs or troughs, covering the raisins with water at 60° F. to 70° F. (16° C. to 21° C.), soaking for 10 to 60 minutes, then draining the raisins for 60 minutes or more.

Drawbacks of this conditioning process are that it is cumbersome and time-consuming, and that the resulting raisins lack uniformity, displaying a wide range of moisture levels and other properties. Excessive exposure to water during attempts to moisturize weakens the skins of the raisins, thereby increasing their susceptibility to bursting. Excessive exposure to water also leaches sugars from the raisins, which causes a loss of taste appeal and a dilution of the dark brown color which is characteristic of raisins. The dark brown color is particularly important to visual appeal when the raisins are used in baking, since it enhances the contrast between the raisins and white flour. High moisture levels also run a risk of unwanted levels of microbial growth in the raisins, when raisins are preconditioned to a high moisture level and then stored. Microbial growth cannot be controlled by treatment with antimicrobials, since the retention of antimicrobials in the final baked goods would be undesirable from a potential toxicity standpoint, and antimicrobials retard the action of yeast, thereby interfering with baking. A further reason not to use antimicrobials is that they would detract from the natural foods character of the raisins. As mentioned above, if the moisture level of raisins used in baking with dough is too low, the raisins tend to draw moisture from the remaining ingredients of the food product. In baked products, for example, the remaining ingredient is dough, whereas in dairy products, the remaining ingredient is ice cream, cream cheese or whatever other type of dairy product is being prepared. In each case, the resulting food product is drier, and in the case of baked goods, the goods will have a texture gives the impression of being less fresh. Even when the product has a fresh-appearing texture after baking, the product will generally have a relatively short shelf life.

With these variations in the moisture level of raisins used in baked, dairy or other food products whose texture, appearance and mouthfeel are affected by moisture content, the result is a lack of control over the quality of these products when raisins are incorporated. The present invention addresses these and other problems.

SUMMARY OF THE INVENTION

It has now been discovered that raisins can be simultaneously preconditioned to a uniform moisture level acceptable for use in the food industry and packaged in a manner which will permit prolonged storage and shipment, while preventing sugaring and spoilage. The process and the preconditioned raisins formed by the process provide the food processing operation, whether it be a baking operation, a confectionery, a producer of dairy products or the like, with raisins which can be directly incorporated into the processing operation without the need to be conditioned on site. The invention further provides a means of treating raisins with additives such as flavoring agents, sweeteners and coating materials while preconditioning them to a high moisture level. By providing preconditioned raisins which incorporate these additives, the invention again provides raisins that a food processing operation can utilize directly without either further conditioning or treatment with the additives.

In accordance with this invention, the raisins are exposed to an atmosphere of steam or hot water to raise the moisture content of the raisins to a level acceptable for subsequent use in food processing, and to raise the temperature of the raisins to permit them to be packaged at an elevated temperature which, when maintained for a sufficient period of time, will destroy, or prevent the growth of, microorganisms such as yeast or mold ascospores. Prior to the packaging of the heated raisins, the oxygen content of the atmosphere surrounding the raisins is lowered. The still heated raisins are then packaged in sealed containers in this lowered-oxygen atmosphere, and held at the elevated temperature for specified period of time sufficient to both prevent sugaring and destroy microorganisms, as explained below. The sealed raisins are then ready for storage for an extended period of time under normal raisin storage conditions, after which time, they will be suitable for use with none of the disadvantages of the prior art, or considerably less thereof.

Further features, advantages and embodiments of the invention will be apparent from the description which follows.

DETAILED DESCRIPTION OF THE INVENTION AND PREFERRED EMBODIMENTS

It is presently contemplated that this invention will be applied most often to clean, de-stemmed raisins having a moisture content ranging from about 14% to about 18%, preferably about 17% to about 18%. In accordance with this invention, the procedural steps described briefly above and in more detail below are performed to raise the moisture level of raisins to a level of from about 20% to about 36% by weight. Within this range, a preferred goal is to achieve a moisture level of from about 23% to about 29% by weight.

To achieve a moisture content close to the upper end of the preferred range and above, the raisins may first be prewet to raise the moisture content to about 18% or higher. Prewetting is not critical to this invention, however, and in cases where it is done, the conditions and procedures may vary.

In accordance with the invention, the raisins are then exposed to an atmosphere of saturated steam or hot water under atmospheric or superatmospheric pressure for a time sufficient to raise the internal temperature of the raisins to 130° F. (54° C.) or above, preferably to a level of from about 130° F. to about 180° F. (54° C. to 82° C.). When hot water is used, this can be achieved with a water temperature of from about 160° F. to about 210° F. (71° C. to 99° C.). In either case, the length of time required to raise the temperature of the raisins to the desired level will vary with the type of atmosphere, the method used and the desired temperature level. In most cases, acceptable results will generally be achieved with an exposure time of from about thirty seconds to about seven minutes.

A wide range of equipment and methods conventionally used in food processing may be used for this treatment. Examples are swept-surface heat exchangers, vacuum and steam injection equipment, tumbling chambers, and continuous atmospheric steam injection chambers.

The moisture level achieved in the raisins by this step is preferably within the range of about 23% to about 29% by weight, most preferably around 26% by weight. Microbial growth in a food product is influenced by the availability of water. A measure of this can be made by determining the water activity. It is further preferred that the water activity of the raisins resulting from this treatment be at a level of about 0.830 or below, more preferably about 0.800 or below. A preferred range of water activity is about 0.650 to about 0.800.

Conducted in this manner, the process of the present invention will result in raisins with a pH of about 4.0 or below, preferably about 3.75 or below. This is particularly beneficial for the prevention of the germination of certain microorganisms, notably spores of *C. botulinum*.

At this point, the addition of further ingredients to the raisins may be done as an optional step. These ingredients may vary widely in nature, composition, and the manner in which they are applied. Examples are flavoring agents, sweeteners and coating materials, and methods of applying them may be by absorption, infusion, or vacuum infusion, or by applying a uniform film over the raisin surface. The ingredients and the methods by which they are applied are well known among those skilled in the art, and in the context of the present invention these methods are practiced in the same manner in which they are practiced in other, more conventional uses.

The processed raisins are then packaged in an atmosphere of lowered oxygen content, which again may be accomplished with a variety of conventional methods and materials. In the preferred practice of the invention, the raisins are placed in film pouches which are resistant to the passage of water vapor and to the passage of atmospheric gases such as oxygen, nitrogen and carbon dioxide. Polylaminates are preferred materials for the pouches. Examples of suitable polylaminates are those which include a layer of oriented polypropylene serving as a carrier, a layer of polyvinylidene chloride (PVDC) or ethylene-vinyl alcohol copolymer (EVOH) serving as a barrier to moisture and gas transmission, and a layer of linear low-density polyethylene for heat sealability and resistance to mechanical damage. The raisins are placed in the film pouches while the raisins are still at the elevated temperature and the raised internal moisture level, both resulting from the hot water/steam treatment. The size of the packaging has no significant effect on the effectiveness of the process or the product quality, and may range for example from pouches with a capacity of about 4 ounces of raisins to those with a capacity of about 1100 pounds of raisins. In a presently preferred practice of the invention, pouches having a capacity of 6 ounces and pouches having a capacity of thirty pounds, as well as any sizes in between, are used. The packages are of polyvinylidene chloride or ethylene-vinyl alcohol copolymer, with the following specifications:

nominal gauge: 3–4 mils (0.076–0.102 mm)

maximum moisture vapor transmission rate: 1 g per 24 hours per 100 square inches (0,065 square meter), taken at one atmosphere, 100° F. (38° C.) and 100% relative humidity; and less than 1 g per 24 hours per 100 square inches (0.065 square meter) taken at one atmosphere, 100° F. (38° C.) and 90% relative humidity maximum oxygen transmission rate: 10 cc per 24 hours per square meter, taken at one atmosphere, 73° F. (23° C.) and 50% relative humidity; and less than 20 cc per 24 hours per square meter, taken at one atmosphere, 73° F. (23° C.) and 80% relative humidity The lowering of the oxygen content in the atmosphere surrounding the raisins is conveniently performed in the packaging itself. With pouches, for example, this may be achieved by evacuating the raisin-filled pouch of air, i.e., drawing a partial vacuum, and purging the pouch with an inert, oxygen-free gas, the most convenient of which is nitrogen. Evacuation and purging may be performed in cycles to achieve low oxygen levels. The preferred result is that the raisins will be in an atmosphere of less than about 5% oxygen by weight, preferably less than about 2%, and most preferably about 1%. For 6-ounce pouches, this is conveniently done as the raisins are being placed in the pouches in a continuous packaging machine which both forms the pouches and fills them, each machine containing a single filler tube to supply the raisins and a single feed line for the pouch material. During the filling operation, nitrogen is released into the filler tube in a constant flow at 10–30 psi (0.68 to 2.04 atmospheres), preferably about 20 psi (1.36 atmospheres). For thirty-pound packages, evacuation and purging are preferably performed after the raisins have been placed in the packages but before the packages have been sealed. One effective procedure is to apply a vacuum of 22 to 27 inches of mercury (0.7332 to 0.8998 atmosphere), then purge with nitrogen for 1.0±0.5 seconds at 25–50 psi (1.70 to 3.40 atmospheres), preferably 40 psi (2.72 atmospheres) at a flow rate of 5 to 15, preferably 9, cubic feet per minute.

Once the oxygen content in the atmosphere is lowered, the packaging is sealed, again while the raisins are still at the raised moisture and temperature levels. Sealing is achieved by conventional methods, depending on the packaging material. Polylaminate pouches such as those described above are readily sealed by heat and pressure along edges surrounding the openings.

The raisins are then held in the sealed packaging at the raised temperature or slightly less for a period of time sufficient to both prevent or eliminate sugaring and to destroy any spoilage microorganisms present. Sugaring is prevented by maintaining a temperature in excess of about 120° F. (49° C.) for at least about twelve hours, preferably at least about twenty-four hours, while microorganism elimination is achieved by using a temperature in excess of about 130° F. (54° C.) for either all or a portion of this time, depending on how high a temperature is used. Care should be taken, however, to avoid heat exposure which is substantially in excess of the required amount. The selection of an optimal time-temperature relation for any particular packaging size is a matter of routine skill, and is easily within the purview of those skilled in the art. Since the presence or absence of spoilage microorganisms is readily determinable by routine detection techniques which are well known and widely practiced in food laboratories, one may readily determine by routine experimentation whether or not the microorganisms have been destroyed.

As a general guide, however, best results will be achieved when the high-temperature segment of the heating period (i.e., the segment at which the temperature is above 130° F.) is at approximately 130° F. or higher for a length of time which decreases as the temperature increases. The time-temperature relationship for this high-temperature segment is a continuous curve which is empirically determinable from various points known to the inventors along the curve. For example, if the temperature is 130° F., the corresponding time duration is approximately twelve hours. This is a presently preferred protocol for packaging. Other points on the curve are as follows: 140° F. (54° C.) for 100 minutes, 150° F. (66° C.) for 7 minutes; 160° F. (71° C.) for 1.5 minutes; 170° F. (77° C. for 45 seconds; and 180° F. (82° C.) for 15 seconds. Nevertheless, it should be emphasized that the curve is a continuum, and that temperatures intermediate of these will have corresponding durations. One skilled in the art will thus be able to determine the appropriate time for any given temperature by simple interpolation.

In a presently preferred practice of the invention, the raisins in heat-sealed, moisture-impermeable and gas-impermeable pouches are packed into thirty-pound fiberboard shipping containers at about 150° F. (66° C.), placed on pallets, and the pallets stacked and permitted to stand for 24 hours at 120° F. (49° C.) or above, of which twelve hours are at 130° F., before shipment or other handling.

Raisins preconditioned in accordance with this invention will remain moist, succulent and fresh in appearance and texture, will be of uniform moisture content, and will have a shelf life of up to one year. Furthermore, these raisins when used in baked goods will not, or will show a markedly lesser tendency to, form "halo" stains in the goods. Preconditioning in accordance with this invention will also produce an increase in yield of usable raisins due to the uniformity. Yield increases of up to 15% have been observed.

The foregoing is offered primarily for purposes of illustration. It will be readily apparent to those skilled in the art that the operating conditions, materials, procedural steps and other parameters of the invention as it is described herein may be further modified or substituted in various ways without departing from the spirit and scope of the invention.

What is claimed is:

1. A method for preconditioning raisins for use in the preparation of raisin-containing food preparations, said method comprising:
   (a) exposing said raisins to heated water or steam to heat said raisins to an elevated temperature of at least about 130° F.;
   b) while said raisins are at said elevated temperature, placing said raisins in packaging which is substantially impermeable to moisture and to air, in an atmosphere of less than about 5% oxygen, and sealing said raisins in said packaging; and
   (c) storing said raisins thus sealed in said packaging for a period at least about twelve hours at a temperature of at least about 120° F., said period including a segment of said period at a temperature of at least about 130° F. for a sufficient period of time to substantially destroy all microorganisms therein wherein said stored raisins have a moisture content between about 20% to about 36% by weight.

2. A method in accordance with claim 1 in which said step (c) comprises storing said raisins for a period of at least about twenty-four hours at a temperature of at least about 120° F., and said segment of said period of step (c) is at a temperature of at least about 130° F. for at least about twelve hours.

3. A method in accordance with claim 1 in which said segment of step (c) is at a temperature of at least about 140° F. for at least about one hundred minutes.

4. A method in accordance with claim 1 in which said segment of step (c) is at a temperature of at least about 150° F. for at least about seven minutes.

5. A method in accordance with claim 1 in which said segment of step (c) is at a temperature of at least about 160° F. for at least about 1.5 minutes.

6. A method in accordance with claim 1 in which said segment of step (c) is at a temperature of at least about 170° F. for at least about 0.75 minutes.

7. A method in accordance with claim 1 in which said segment of step (c) is at a temperature of at least about 180° F. for at least about 0.25 minutes.

8. A method in accordance with claim 1 further comprising wetting said raisins with water at approximately ambient temperature prior to step (a).

9. A method in accordance with claim 1 in which step (b) includes at least partially evacuating air from said packaging, followed by purging said packaging with an inert, oxygen-free gas.

10. A method in accordance with claim 8 in which said evacuation and purging are performed to achieve an oxygen content in said packaging of less than about 2%.

11. A method in accordance with claim 1 in which step (a) provides said raisins with a water activity of from about 0.650 to about 0.800.

12. A method in accordance with claim 1 in which said elevated temperature of step (a) is from about 130° F. to about 180° F.

13. A method in accordance with claim 1 in which step (a) comprises exposing said raisins to heated water at a temperature of from about 160° F. to about 210° F. or saturated steam for a period of time ranging from about thirty seconds to about seven minutes.

14. A method in accordance with claim 1 further comprising applying at least one member selected from the group consisting of flavors, sweeteners, coating materials, humectants and flowing agents to said raisins between steps (a) and (b).

15. A method in accordance with claim 1 further comprising wetting said raisins with water at approximately ambient temperature prior to step (a), and applying to said raisins at least one member selected from the group consisting of flavors, sweeteners and coating materials prior to step (b).

16. A method for preconditioning raisins for use in the preparation of raisin-containing food preparations, said method comprising:
    (a) wetting said raisins with water at approximately ambient temperature;
    (b) exposing said raisins to heated water or steam to heat said raisins to an elevated temperature of from about 130° F. to about 180° F.;
    (c) while said raisins are at said elevated temperature:
        (i) placing said raisins in packaging which is substantially impermeable to moisture and to air;
        (ii) alternately evacuating gas from said packaging and purging said packing with an inert, oxygen-free gas to achieve an oxygen content in said packaging of less than about 2% by volume; and
        (iii) sealing said raisins in said packaging; and
    (d) storing said raisins thus sealed in said packaging at a temperature
of at least about 130° F. for at least about twelve hours wherein said stored resins have a moisture content between about 20% to about 36% by weight.

* * * * *

UNITED STATES PATENT AND TRADEMARK OFFICE
CERTIFICATE OF CORRECTION

PATENT NO. : 5,397,583
DATED : March 14, 1995
INVENTOR(S) : Richard B. Bruno, Corinne Huey It is certified that error appears in the above-indentified patent and that said Letters Patent is hereby corrected as shown below:

On the title page, item [75] Inventor: "Huey, Corinne, Woodland" should read --Corinne Huey, Woodland--.

column 2, line 3, under Other Publications, "Txture" should read --Texture--.

Column 2, line 19, insert --which--, after "texture".
Column 4, line 39, delete "(0,065" and insert --(0.065--.
Column 8, line 20, after "temperature", continue the remainder of the claim on the same line.
Column 8, line 22, delete "resins" and insert --raisins--.

Signed and Sealed this

Twenty-seventh Day of June, 1995

Attest:

BRUCE LEHMAN

*Attesting Officer*     *Commissioner of Patents and Trademarks*